United States Patent
Wade et al.

[11] 3,739,134
[45] June 12, 1973

[54] PROCESS FOR TACK WELDING AND FINISHING SPIRALWELD PIPE

[75] Inventors: Harry C. Wade, Hamilton; John W. Witts, Fonthill, Ontario, both of Canada

[73] Assignee: The Steel Company of Canada Limited, Hamilton, Ontario, Canada

[22] Filed: Dec. 29, 1971

[21] Appl. No.: 213,269

[52] U.S. Cl. .................. 219/62, 219/73, 219/137
[51] Int. Cl. .................................. B23k 1/16
[58] Field of Search ............. 219/60, 61, 62, 125, 219/137, 87, 73

[56] References Cited
UNITED STATES PATENTS

| | | | |
|---|---|---|---|
| 3,495,064 | 2/1970 | Grimoldi et al. | 219/60 R |
| 1,832,059 | 11/1931 | Stresau | 219/62 |
| 3,030,488 | 4/1962 | Kuckens | 219/62 |
| 1,847,310 | 3/1932 | Schmitz | 219/61 X |
| 2,819,379 | 1/1958 | Wiley et al. | 219/62 |

Primary Examiner—J. V. Truhe
Assistant Examiner—L. A. Schutzman
Attorney—Peter W. McBurney and Donald F. Sim

[57] ABSTRACT

A process is disclosed for producing spiralweld pipe, in which skelp is delivered to a rolling station, rolled, and continuously tack-welded together at the lowermost point in the vertical cross-section of the pipe. The pipe is removed and the tack-weld is converted to a secure seam by submerged-arc welding at another location.

4 Claims, 2 Drawing Figures

PATENTED JUN 12 1973          3,739,134

INVENTORS
HARRY C. WADE.
JOHN W. WITTS.

PROCESS FOR TACK WELDING AND FINISHING SPIRALWELD PIPE

This invention relates to the manufacture of spiral seam tubing or pipe, in which wide, flat metal strip, or "skelp" as it is sometimes known, is fed into a spiralling apparatus consisting of rollers and other elements which give to the flat strip a constant radius of curvature about a hypothetical centre line which is oblique to the direction of motion of the strip and is spaced above the strip by a distance equal to the radius of curvature. The obliquity of the angle between the hypothetical centre line and the direction of motion of the strip is a function of the diameter of the tube or pipe and the width of the strip.

BACKGROUND OF THE INVENTION

In the manufacture of large-diameter pipe, there are two basic processes presently in use. One very common process turns out longitudinal seam piping and in the trade is usually termed U-ing and O-ing. In this process, a predetermined length of skelp is first forced into the shape of a U by means of a press die, and then a suitable apparatus closes the U around to form an O in which the two edges of the skelp are in close proximity or are touching. With the skelp held in the edge-to-edge O configuration, a tack-weld is applied, either by metal arc welding or any other known process, and then the pipe is run through a submerged arc welding process firstly with the seam downwardly so that the weld bead is applied on the inside of the pipe, and secondly with the seam upwardly so that the weld seam is applied on the outside of the pipe.

Alternatively, the skelp or strip can be run continuously through deforming rollers which bring the edges around into contact to form an O, and the tack-welding is continuously applied as the edges come together.

It will be appreciated that, in the manufacture of longitudinal seam piping, the maximum pipe diameter depends upon the maximum width of the skelp. In practical terms, there is a limit to the maximum width of the skelp, and this width is determined by the width capacity of the rolling mill used to manufacture the skelp.

The second of the two major processes for manufacturing piping or tubing from skelp or strip differs from the one just described in that the width of the skelp is no longer a limiting factor on the diameter of the pipe. This process is spiral forming and welding, and it is to this method that the present invention is particularly directed.

In one conventional process for manufacturing spiral weld pipe, the strip or skelp is fed into a bending or rolling apparatus which curves the skelp in such a way that it defines a cylindrical surface equidistant from a hypothetical centre line set at an angle to the direction in which the skelp is fed. Usually, the skelp is curved upwardly, and for convenience we may describe stationary positions along the path of the moving skelp in terms of hours of a clock face, such that the point at which the skelp begins to curve is the 6 o'clock position. The skelp curves anti-clockwise upwardly through the 3 o'clock and 12 o'clock positions, and then back downwardly through the 9 o'clock to the 6 o'clock position. When the skelp once again reaches the 6 o'clock position, one edge of the original flat skelp is exactly aligned with what was originally the other edge of the skelp. In the conventional process, a submerged arc welding head is located at the 6 o'clock position between the two edges that are coming together, and continuously applies a seam weld to the inside of the spiral pipe under formation. 180° later, at the 12 o'clock position, another submerged arc welding head applies the outside diameter weld.

DISADVANTAGES OF CONVENTIONAL METHOD

The problems and deficiencies of the methods described arise from the fact that the process calls for forming and welding to be carried out almost simultaneously at the same station. Essentially, the difficulties relate to two factors: the slowness of the submerged arc welding process, and the instability of the seam during solidification of the weld bead. Regarding the second of these factors, the problems become more acute as the welding speeds increase, and as heavier walls and higher steel grades are used. The critical point of the process is the control of the seam gap and edge alignment at the inside diameter weld point. Operator skill or sophisticated monitoring and servomechanism control is required to maintain the inside diameter weld gap at approximately nil to 0.015 inches prior to welding. With regard to the first factor, regardless of whether single wire or double wire submerged arc welding is used, an upper limit in the speed of production of the spiral weld pipe is created because the molten weld bead at the inside diameter weld (the first welding station at 6 o'clock) does not have time to solidify before it is carried upwardly toward the 3 o'clock position by the movement of the pipe. As a result, the molten material runs down the pipe as the weld seam moves up the spiral and the quality of the weld seam is destroyed if the welding speed is too fast.

One attempt to overcome the foregoing problems is set out in British Pat. No. 1,109,343 (U.S. equivalent Pat. No. 3,300,616), entitled "Apparatus for Resistance Welding of Spiral Seam Tubing By High-Frequency Alternating Current," invented by Sablotny and Wenneman, filed May 10, 1966, and published Apr. 10, 1968. The process of this patent consists of using a high-frequency electric resistance tack-weld at the 6 o'clock position as the spiral weld pipe is being formed, followed by removal of the tack-welded pipe from the forming apparatus to an off-line submerged arc rewelding apparatus, which applies an inside and outside submerged arc welding bead to complete the pipe. In the process according to British Pat. No. 1,109,343, the edges of the strip are machined to an angle of 35° to the vertical plane, and the high frequency electric resistance welding takes place continuously using Thermatool contacts. Welding is achieved by controlling the convergence angle of the strip edges, and necessitates a certain edge-to-edge contact or "upset" pressure for the tack-welds to develop. This upset pressure is applied by vertical squeeze rolls pressing the one edge down on the other, and because the edges are at an angle of 35° a horizontal force component is achieved. Without this pressure of one edge against the other, no welding would take place, even though the edges have been raised to the welding temperature by means of electric resistance. The difficulty with the process set out in British Pat. No. 1,109,343 arises largely because of the necessity to maintain weld "upset" pressure between the edges and at the same time to maintain alignment between pipe wraps. Because the fusion line of the butt weld is inclined to the perpendicular, there results a tendency toward misalignment of the edges, which are tack-welded together in a misaligned position. The subsequent submerged arc rewelding process cannot correct the original misalignment, and thus a defective or poor quality pipe might result. A further disadvantage arises from the possibility of slag inclusions in the final weld resulting from the oxidized ERW weld flash and its subsequent entrapment during the submerged arc rewelding.

Essentially, the approach to the solution of the slowness of the original spiral weld manufacturing process, as exemplified in British Pat. No. 1,109,343, is sound. The idea is to replace the original submerged arc welding at 6 o'clock and 12 o'clock along the path of the spiral strip by a single tack-welding process at the 6 o'clock position, the tack welding process being such as to permit a high rate of welding speed, commensurate with the maximum rate at which the spiral rollers can form the strip into the proper configuration. As the lengths of spiral weld pipe are formed in this preliminary condition, they are then removed to one or more rewelding stations for completion of the submerged arc rewelding. If the formation of the spiral weld pipe, and the tack-welding process, were four times as fast, say, as the submerged arc rewelding process, it would require four rewelding stations to provide sufficient capacity to accommodate the spiral weld lengths produced by the rolling and tack-welding. Thus, the rolling process need not be "held back" by the slowness of the submerged arc welding process.

As pointed out above, British Pat. No. 1,109,343 represents one possible solution to the problem. However, it has imperfections which require further development.

OBJECT OF THIS INVENTION

The primary object of this invention is to improve upon the process set out in British Pat. No. 1,109,343, such that a right-angle edge preparation of the skelp may be utilized, the risk of misalignment between the edges of the spiralweld pipe is greatly reduced, and the likelihood of slag inclusions in the final rewelded bead is minimized.

GENERAL DESCRIPTION OF THE INVENTION

Essentially, the process of this invention comprises the steps of continuously delivering skelp to a rolling station, continuously rolling the skelp at the rolling station into a spiral pipe, continuously tack-welding the edges of the skelp together where they are in proximity at the lowermost point of the spiral pipe by a gas shielded arc-welding technique, removing the tack-welded spiral pipe to a submerged-arc welding station, and converting the tack-weld to a secure seam by submerged-arc welding.

DETAILED DESCRIPTION OF THE INVENTION

Figure 1:
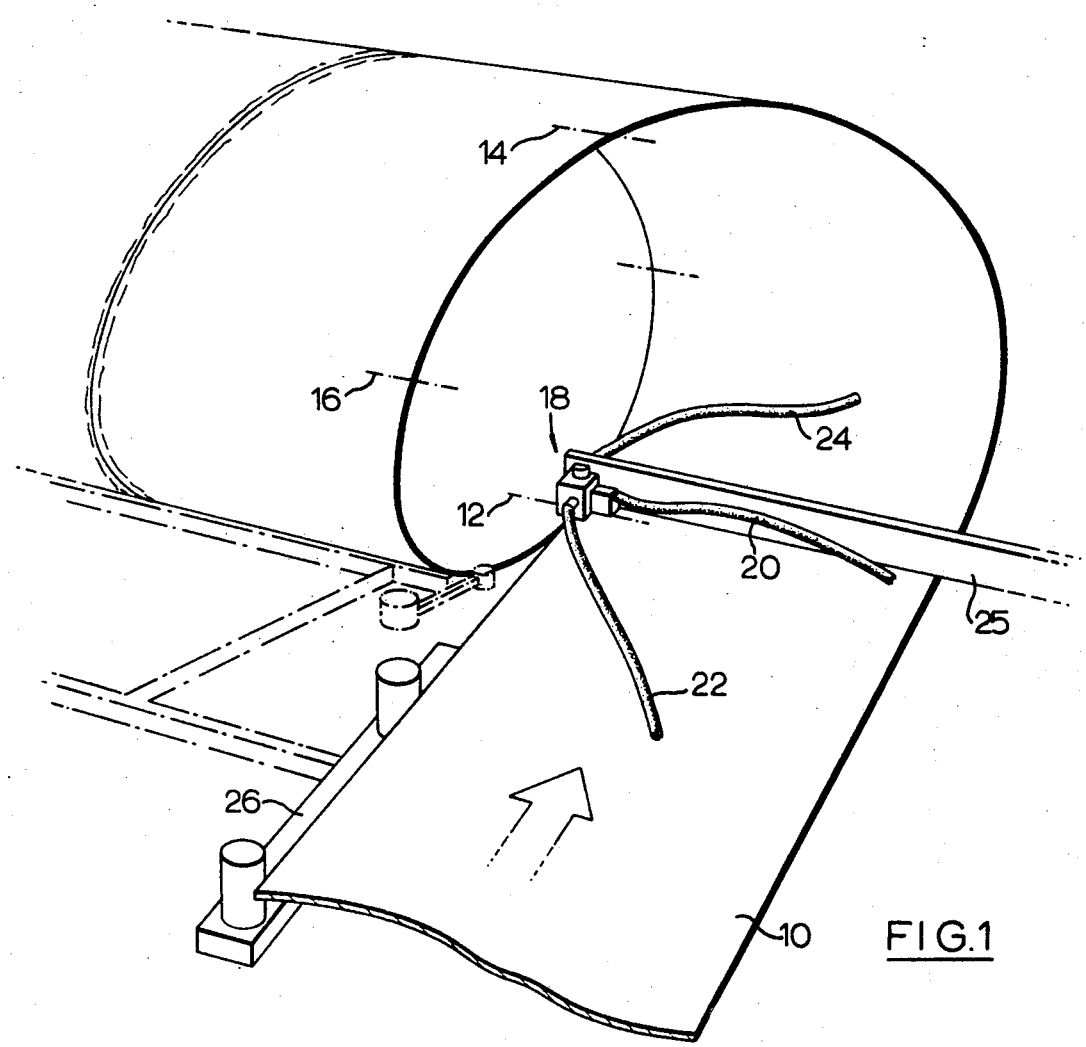
Figure 2:
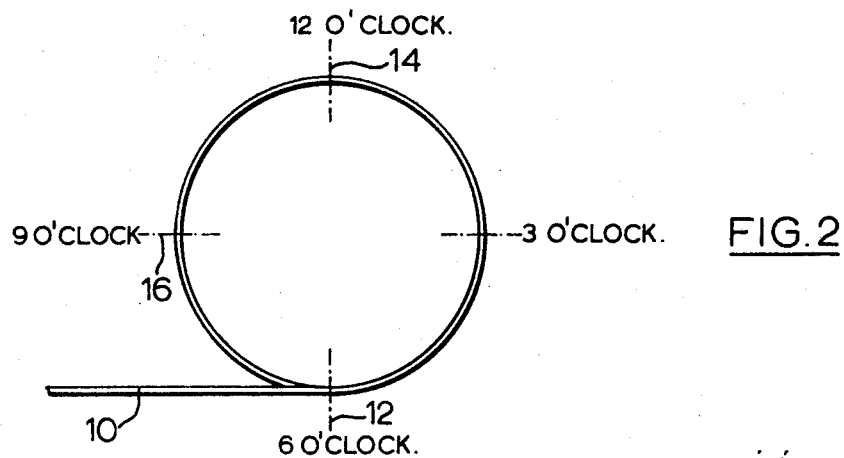

One embodiment of this invention is shown in the accompanying drawings, in which like numerals denote like parts throughout the several views and in which:

FIG. 1 is a perspective view of the rolling and welding station in the formation of spiral weld pipe; and FIG. 2 is a schematic axial view of the skelp.

In FIG. 1, 10 is the strip or skelp of rolled metal still in the flat condition and moving toward the 6 o'clock location 12 at which it will pass through rollers (not shown) and acquire a curvature which brings it around to the 12 o'clock position shown at 14, down through the 9 o'clock position shown at 16, and back into edge-to-edge proximity with itself at the 6 o'clock position again shown by the numeral 12. FIG. 2 shows these positions more clearly. A metal-inert gas (MIG) welding head 18 of conventional design has the usual wire feed 20, gas shielding lines 22, water cooling pipes 24, and support arm 25. A conventional mechanism 26 controls the weld gap between the adjacent edges of the strip 10. As the two edges come together, they are maintained at a spacing of between nil and 0.015 inches, and they are tack-welded together by the MIG welding head 18. The spirally curved strip, now tack-welded to itself, continues to spiral in the leftward direction in FIG. 1, and the pipe is continuously formed until the desired length is achieved. The tack-welded length of spiral weld pipe is then removed from the forming and tack-welding apparatus to a submerged arc welding station where the tack-weld is converted to a secure seam weld by the conventional submerged-arc process.

The lengths of tack-welded pipe can be severed from one another by conventional methods such as sawing or gas cutting.

Preferably, the edges of the strip or skelp are milled or planed square and the edges are machined to form a single or double chamfer at an angle of about 30° to the vertical and about ¼ to ⅜ inch long. When the two edges come together for tack-welding, a V-groove or double V-groove with a straight land is formed by the two mating edges. Double V-grooves have been used traditionally for heavier gauges of steel and single V-grooves for the lighter gauges.

In the embodiment described above, MIG (Metal-Inert-Gas) welding is described with regard to the tack-welding step. In this method, welding metal in the form of one or two wires, which is melted by the arc, is fed continuously through the welding gun and acts as the electrode or electrodes. Because it melts to form the weld bead, it is a "consumable electrode" process. A stream of inert gas, such as argon, flowing from the welding gun surrounds the melting electrode and pool of molten weld metal and shields them from oxidation.

In place of MIG welding, it is possible to utilize $CO_2$ welding, which is essentially the same as MIG welding except that carbon dioxide ($CO_2$) is used as the shielding gas instead of an inert gas such as argon. The principle advantage is that carbon dioxide is much cheaper than argon.

A third alternative is TIG welding, in which the electrode is a non-consumable tungsten alloy (e.g. thoriated tungsten, zirconiated tungsten, etc.). If weld metal is desired it must be melted in the arc region from an external source. As in MIG welding, a stream of inert gas flows from the welding gun and shields a pool of molten metal from oxidation.

In view of the foregoing alternatives, this invention is not considered limited to MIG welding, but embraces tack-welding by any gas shielded arc-welding technique in which the gas is either an inert gas or carbon dioxide, or a combination of these, and which employs either a consumable or a non-consumable electrode.

In experimental trials on skelp of 0.500 inch thickness, tack-welding rates of up to 100 inches per minute have been achieved. It is considered that tack-welding speeds in the neighbourhood of 80 inches per minute should be readily achieved on skelp of 0.625 inch thickness in the larger diameter pipe range of 36 inches to 60 inches. The tack-welded pipe produced in the experimental trials was rewelded by single wire submerged arc process with very satisfactory results.

What we claim is:

1. A process for producing spiralweld pipe, comprising the steps:

continuously delivering skelp to a rolling station, continuously rolling the skelp at the rolling station into a spiral pipe, continuously tack-welding the edges of said skelp together where they are in proximity at the lowermost point of the spiral pipe by a gas shielded arc-welding technique, removing the tack-welded spiral pipe to a submerged-arc welding station, and converting the tack-weld to a secure seam by submerged-arc welding.

2. The process claimed in claim 1, in which the step of continuously delivering skelp is preceded by the step of milling the edges of the skelp to form a chamfer of about 30° to the vertical.

3. A process for producing spiralweld pipe comprising the steps:

continuously delivering skelp substantially horizontally to a rolling station, continuously rolling the skelp curvingly upwardly into a spiral pipe, using a gas shielded arc-welding technique to tack-weld the edges of the skelp continuously together where they first come into proximity at the lowermost point of the spiral pipe, cutting the rolled tack-welded spiral pipe into sections, continuously distributing the sections to a plurality of submerged-arc welding stations, and converting the tack-welds of the section into secure seams by submerged-arc welding at the last-mentioned stations.

4. The process claimed in claim 3, in which the step of continuously delivering skelp is preceded by the step of milling the edges of the skelp to form a chamfer of about 30° to the horizontal, and in which the gas shielded arc-welding technique is metal-inert-gas welding.

* * * * *